Nov. 15, 1966  H. R. BOHANON  3,285,156
LIGHT TRAP
Filed Oct. 16, 1964

INVENTOR
HOY R. BOHANON
BY Semmes & Semmes
ATTORNEYS

United States Patent Office 3,285,156
Patented Nov. 15, 1966

3,285,156
LIGHT TRAP
Hoy R. Bohanon, Muskogee, Okla., assignor to Acme Engineering and Manufacturing Corporation, Muskogee, Okla., a corporation of Oklahoma
Filed Oct. 16, 1964, Ser. No. 404,442
1 Claim. (Cl. 98—121)

The invention disclosed herein relates to light traps and in particular to an improved light trap for commerical use with low pressure fans in the agricultural market.

A light trap, to be commercially acceptable in the agricultural market, must (1) exclude light and (2) enable large quantities of air at a low pressure loss to pass therethrough. The pressure losses resulting from the use of a light trap in conjunction with a fan are two-fold. First, a pressure loss occurs in the trap itself caused by the direction of movement (turning) of the air in the trap. Secondly, downstream pressure losses may occur in the fan as a result of air leaving the trap in a direction not normal to the plane of the trap.

As will be apparent, the pressure loss in the trap itself is regulated by varying the flow path of air therethrough. Obviously, the more gentle the radius of curvature of the air path, the less the resulting air pressure loss will be. Conversely, as the radius of curvature of the path of air through the trap decreases, the ability to reduce the light intensity decreases. Downstream pressure losses are minimized in the present invention by insuring that the air leaving the trap is normal to the plane thereof thus precluding air from flowing merely into one side of the succeeding fan. It must be kept in mind, of course, that the flow area of the air leaving the trap is equal to the area of the face of the trap times the cosine of the angle between the direction of flow and a perpendicular or normal to the trap face. Accordingly, since as large a flow area as possible is desired to keep the velocity of flow at a low value, the ideal direction of flow is normal to the plane of the trap with the above-mentioned angle zero and its cosine equal to unity.

Though light traps and ventilator louver elements are the subject of numerous patents, the present invention constitutes an advancement of great importance in this art enabling light to be adequately excluded with correspondingly low pressure losses.

Lindgren (U.S. Pat. No. 2,925,457), Levinsen (U.S. Pat. No. 2,364,378) and Trost (U.S. Pat. No. 2,378,518) disclose corrugated blades of gentle curvature that reduce in the internal pressure loss. However, these patents fail to disclose blade structure properly designed for insuring that air leaving the traps passes at the proper angle thereto to reduce the pressure losses of the entire system (trap and fan) to the desired minimum. Lindgren's panels, designed for suppressing or attenuating radio waves, include blades of electrically conductive material such as copper rather than the light absorbing finish necessary for reduction of light intensity. Obviously, the radius of curvature (right angle) of Lindgren is totally unsuitable for maintaining pressure losses through his panels. The spirally configured blade of Levinsen is not only economically unfeasible to manufacture but is not designed to complement a square or rectangularly configured fan. Trost utilizes two separate rows of blades which obviously cause greater pressure loss than if interconnected to form a single row of blades.

Westerberg (U.S. Pat. No. 3,056,343), though disclosing light restricting louvers for use in the agricultural field, does not maintain sufficiently low pressure losses to be suitable for use with low pressure fans. Particularly, the high pressure losses resulting from Westerberg's "Zigzag" flow paths are unacceptable for use with low pressure fans.

Accordingly, it is an object of the present invention to provide a simple light trap assembly commercially acceptable in the agricultural market because of its capability of excluding light and enabling large quantities of air at low pressure losses to pass therethrough.

Another object of the present invention is to provide a light trap for use with low pressure commercial fans utilizing blades specifically designed to obtain the optimum exclusion of light while passing large quantities of air at low pressure losses therethrough.

Still another object of the present invention is to provide a light trap for use with low pressure commercial fans in the agricultural market insuring adequate exclusion of light during the passage of large quantities of air at low pressure losses with the use of self-cleaning blades.

A further object of the present invention is to provide a light trap for use in conjunction with low pressure fans in the agricultural market capable of reducing light intensity to a desired minimum while maintaining low pressure losses both in the trap itself and in the subsequent fan.

Yet additional objects of the present invention will become apparent from the ensuing specification and attached drawing which illustrates the improved light trap assembly wherein.

Figure 1:
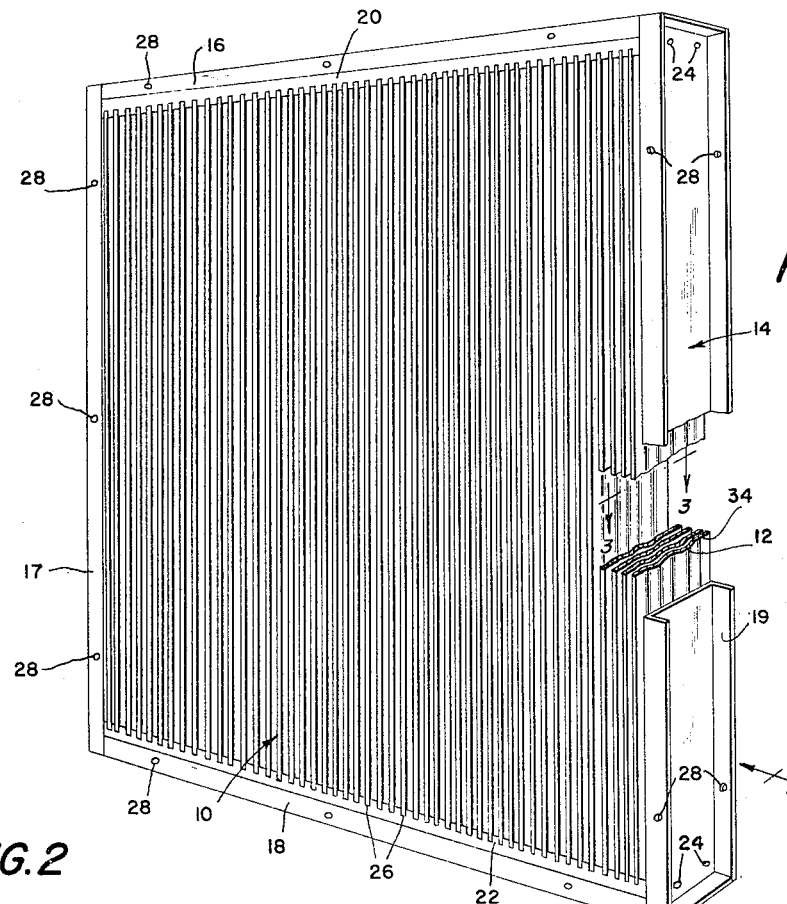
FIG. 1 is a perspective view partly broken to illustrate the improved blades of the present light trap.

As seen in FIG. 1, the improved light trap 10 consists of a plurality of corrugated blades 12 which may, for example, be manufactured from aluminum painted flat black to produce the necessary light absorbing finish. Experimentation has proven that if each blade 12 is provided with two full corrugations, a sufficient reduction in light intensity may be obtained. As seen in detail in FIG. 3, the radius of curvature $r$ of each blade 12 is equal to the space $d$ between adjacent blades. However, the radius of curvature $r$ of the blade surfaces may conceivably be reduced to a value of approximately one-half of the blade spacing $d$ without resulting in unacceptable pressure losses. However, below a radius of curvature equal to one-half of the blade spacing, the pressure losses incurred by the air passing therethrough will increase rapidly until at zero radius (sharp corner) the loss will be approximately four times that achieved by the present design.

Figure 2:
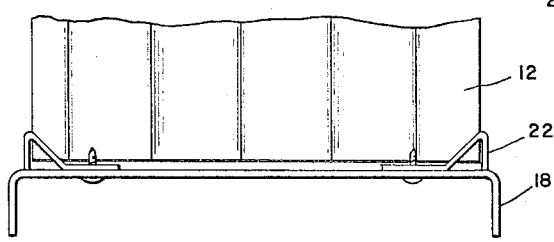
FIG. 2 is an enlarged sectional view taken along line 2—2 of FIG. 1 illustrating the attachment of the improved blades to the light trap assembly.

The frame 14 of the light trap consists of top and bottom supports 16 and 18 held in spaced relationship by vertical side supports 17 and 19 and secured by bolting assemblies 24. Along the inner faces of top and bottom supports 16 and 18 are located blade supporting members 20 and 22. As seen in FIGS. 1 and 2, blade supporting members 20 and 22 include a plurality of laterally spaced slots 26 into which the ends of each blade 12 are inserted. Along the edges of top and bottom supports 16 and 18 and vertical side supports 17 and 19 are located a plurality of openings 28 enabling the frame 14 of the light trap to be attached to a wall adjacent the fan opening.

Figure 3:
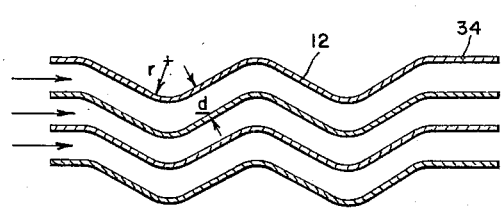
FIG. 3 is an enlarged sectional view taken along line 3—3 of FIG. 1 illustrating the normal leading and trailing edges and the radius of curvature of the corrugated section of the blades.
Figure 4:
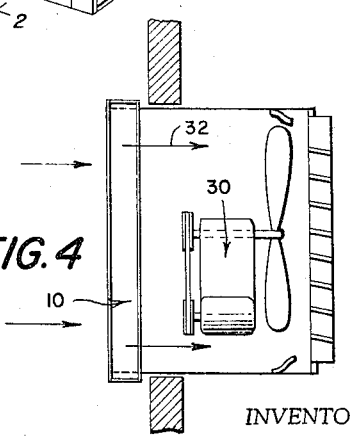
FIG. 4 is a schematic diagram illustrating the relationship of the improved light trap to a commercial low pressure fan when used in the contemplated manner.

FIG. 4 schematically illustrates the relationship be tween the light trap 10 and a conventional low pressure fan 30. Arrow 32 illustrates the normal flow of air through the light trap 10 achieved by the trailing edges 34 of the blades 12 which, as seen in FIGS. 1 and 3, are normal to the plane of light trap 10. Since blades 12 are arranged vertically, a "self-cleaning" effect is achieved as accumulations of dirt tend to move downward eliminating the formation of dirt-pockets.

Manifestly, still further modifications of the light trap may be employed without departing from the scope of invention, as defined by the subjoined claims.

I claim:

A light trap for use with low pressure fans, comprising:

(A) top and bottom supports;
(B) vertically positioned side supports attached to and holding said top and bottom supports in spaced relationship, said supports defining the plane of said light trap;
(C) supporting members for containing blades attached to the lower and upper portions of said top and bottom supports respectively, said supporting members containing pluralities of laterally spaced vertically aligned slots;
(D) a plurality of blades having top and bottom portions inserted within said slots of said supporting members, said blades defining two complete corrugations consisting of two consecutive curvilinear portions, each of said portions having generally diverging and converging sections, said corrugations terminating in leading and trailing edges, said trailing edges being perpendicular to said plane of said light trap, said blades being spaced apart a distance equal to the radius of curvature defining said corrugations.

References Cited by the Examiner

UNITED STATES PATENTS

| 1,323,978 | 12/1919 | Gebhardt | 98—121 X |
| 2,165,650 | 7/1939 | Pfautsch | 98—94 |
| 2,348,886 | 5/1944 | Dodgson | 98—121 X |
| 2,925,457 | 2/1960 | Lindgren | 98—121 X |

FOREIGN PATENTS 1,325,958   3/1963   France.

References Cited by the Applicant

UNITED STATES PATENTS

| 1,118,365 | 11/1914 | Loehler. |
| 2,364,271 | 12/1944 | Carver. |
| 2,364,378 | 12/1944 | Levinsen. |
| 2,378,518 | 6/1945 | Trost. |
| 3,056,343 | 10/1962 | Westerberg. |

ROBERT A. O'LEARY, *Primary Examiner.*

M. A. ANTONAKA, *Assistant Examiner.*